United States Patent [19]

Fremery et al.

[11] Patent Number: 4,619,144
[45] Date of Patent: Oct. 28, 1986

[54] METHOD OF AND APPARATUS FOR GAS PRESSURE MEASUREMENT BY THE GAS-FRICTION PRINCIPLE

[75] Inventors: Johan K. Fremery, Bonn; Bernd Lindenau, Jülich; Klaus Witthauer, Aachen-Vorheide, all of Fed. Rep. of Germany

[73] Assignees: Kernforschungsanlage Jülich, Jülich; RWD-Datentechnik GmbH, Aachen, both of Fed. Rep. of Germany

[21] Appl. No.: 767,170

[22] Filed: Aug. 19, 1985

[30] Foreign Application Priority Data

Aug. 28, 1984 [DE] Fed. Rep. of Germany ....... 3431517

[51] Int. Cl.⁴ .............................................. G01L 19/04
[52] U.S. Cl. ........................................... 73/708; 73/754
[58] Field of Search ................... 73/700, 708, 432 R, 73/517 B, 753

[56] References Cited

U.S. PATENT DOCUMENTS 4,395,914  8/1983  Fremerey et al. .................. 73/700

*Primary Examiner*—Donald O. Woodiel
*Attorney, Agent, or Firm*—Karl F. Ross; Herbert Dubno

[57] ABSTRACT

For measurement of gas pressure a gas-friction vacuum meter is used in whose measuring head a rotating body is suspended in a magnetic field contact-free between electromagnetic drive coils. The rotating body is set in motion with the aid of the drive coils and maintained at a rotational speed above a preset minimum rotational speed. The speed reduction of the rotating body occurring on account of gas friction is continually or intermittently balanced with current flows from a three-phase generator to the drive coils. In the measuring head rotational speed sensors are arranged and positioned, which detect and respond to the rotational frequency of the rotating body, and further transmit output signals to an electronic analyzer unit, which determines the pressure from the timely change of the rotation frequency. In order to increase the pressure range for which the apparatus may be accurately used further, the analyzer unit receives a temperature signal, which correlates with the temperature of the gas surrounding the rotational body, in such a way, that the pressure measurement is corrected for the influence of heat transferred to the gas during operation of the rotating body.

6 Claims, 1 Drawing Figure

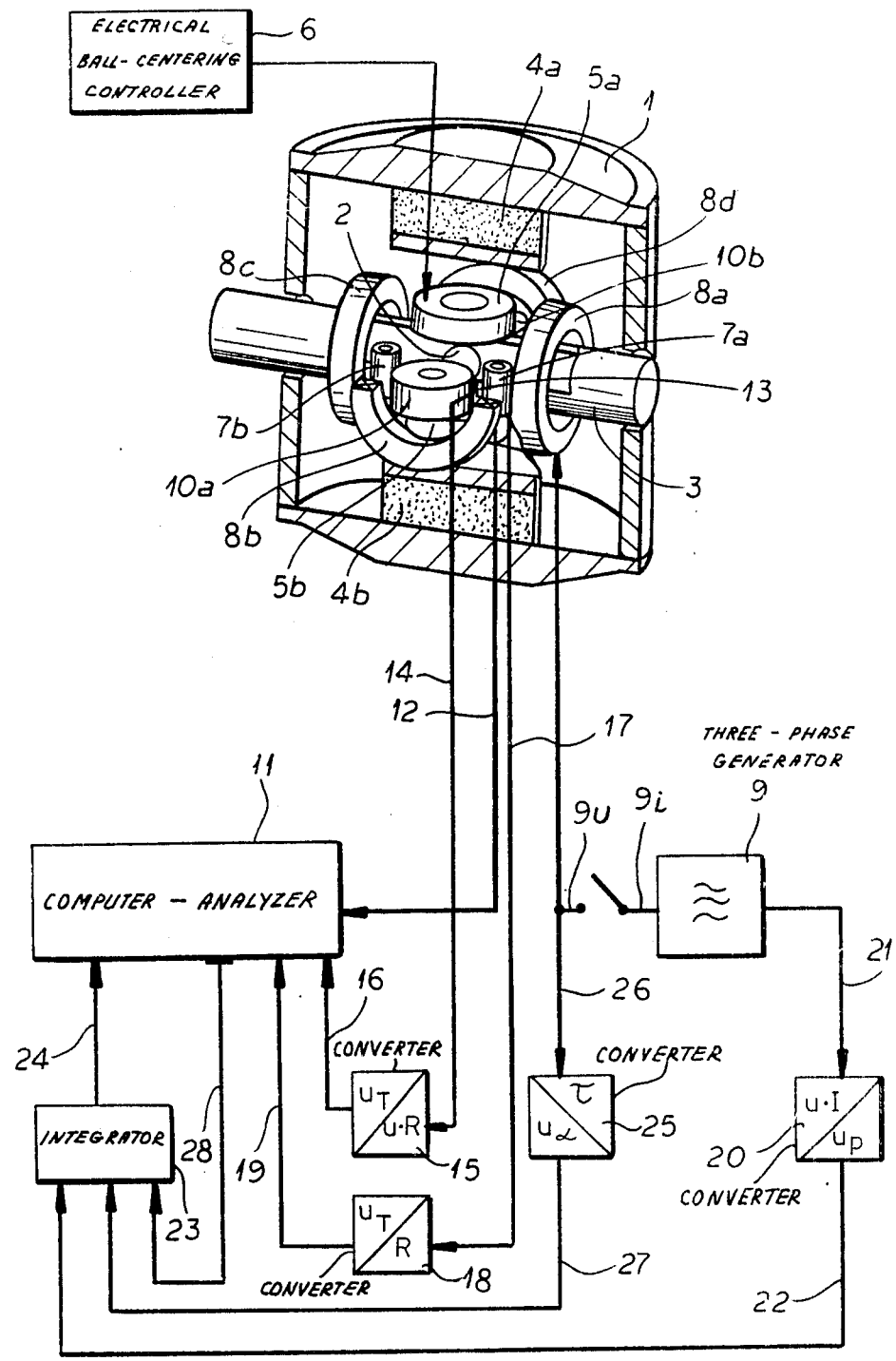

METHOD OF AND APPARATUS FOR GAS PRESSURE MEASUREMENT BY THE GAS-FRICTION PRINCIPLE

FIELD OF THE INVENTION

Our present invention is related to a method of and an apparatus for making pressure measurements in gases and, more particularly, to pressure measurements in the gas phase utilizing a gas-friction vacuum meter.

BACKGROUND OF THE INVENTION

Pressure measurements using a gas-friction vacuum meter are known in the art (see, for example, U.S. Pat. No. 4,395,914 and the art cited therein). These processes use a gas-friction vacuum meter having a rotating body suspended contact-free in a magnetic field in a measuring head, in which, with the aid of drive coils, the rotating body is set into rotation, and is driven at a rotation frequency above a preset minimum rotation frequency.

The rotation speed of the body tends to decrease or does actually decrease as a result of the gas friction and the decrease can be compensated by continuous or intermittent current changes in the drive coils, which are energized with alternating current by a three-phase generator connected to those drive coils.

For detection and measurement of the rotation frequency of the rotating body, rotation speed sensors are positioned and arranged in the measuring head, which further transmit their sensor output signals to an electronic analyzer unit. The latter ascertains or determines the pressure of the gas surrounding the rotating body from the change of the rotation frequency as a function of time.

It is known, for example, to use a gas-friction vacuum meter with a freely-rotating body as a measuring tool for determining the pressure of a gas in the low pressure region, as can be seen for example by a study of German patent DE-PS No. 30 19 315. The measuring range of the known instruments is limited to a pressure range below about 0.10 mbar.

This limitation derives from the fact that the gas friction in a low-pressure high-vacuum environment can be taken to be proportional to pressure below this limit, but in higher gas pressure environments the gas friction increases only weakly with increasing gas pressure.

In gas pressure environments above 0.10 mbar the gas friction is determined essentially by the gas viscosity, which, however, is generally pressure independent. The viscosity however is strongly affected by the temperature. As a result a high pressure temperature- and viscosity-dependent component is superimposed on the comparatively very slight pressure dependence of the gas friction in an undesirable manner, which leads to inaccuracies in the pressure measurement.

The installation of a thermostat, which holds the measuring head at a constant temperature, does not solve the problem, because the magnetic interaction of the rotating body and its rotating field will generate heat irregularly. Some temperature variations are therefore unavoidable.

Consequently the heating of the measuring head and the vacuum chamber enclosing the rotating body occurs by magnetic losses and by electrical power dissipated in the drive coils. The gas surrounding the rotating body therefore has temperature fluctuations in heat exchange with the rotating body and the vacuum chamber, which influence the gas friction. Since variation in the gas friction measured at the rotating body can be caused by a variation in temperature or pressure, or both, the thermal fluctuations in the measuring head hinder the use of the gas-friction vacuum meter for pressure measurements above 0.10 mbar.

OBJECTS OF THE INVENTION

It is an object of this invention to provide an improved apparatus and process for making pressure measurements with a gas-friction vacuum meter.

It is also an object of our invention to provide an improved apparatus and process for making pressure measurements with a gas-friction vacuum meter at pressures above about 0.10 mbar, but without inaccuracies due to temperature variations and gas viscosity influences due to heating of the gas and apparatus by the magnetic interaction with the rotating body.

It is a further object of our invention to provide an improved apparatus for making gas-pressure measurements incorporating and using a gas-friction vacuum meter, in which undesirable temperature fluctuations at the measuring head due to heat exchange between the gas and the apparatus are compensated.

It is yet another object of our invention to provide an improved process for making gas-phase pressure measurements with a gas-friction vacuum meter, in which undesirable temperature fluctuations due to heat exchange between the electromagnetically heated measuring head and the gas are approximately compensated for so that an accurate pressure measurement results.

SUMMARY OF THE INVENTION

These objects and others which will become apparent hereinafter are attained in accordance with our invention in an apparatus and process for making pressure measurements in a gas with a gas-friction vacuum meter having a measuring head, in which a rotating body is suspended contact-free in a magnetic field between a plurality of drive coils, the rotating body being set in rotation with the aid of the drive coils, and maintained in rotation at a rotation speed above a given predetermined minimum rotation frequency, wherein the decrease of the rotational speed of the rotating body occurring as a result of gas friction is compensated for by continuous or intermittent and energization of the drive coils from a three-phase generator, and wherein rotation speed sensors are arranged and positioned in the measuring head, which detect and respond to changes in the rotational frequency of the rotating body, and the signal outputs from the rotation speed sensors are transmitted to an electronic analyzer unit, which determines the pressure of the gas surrounding the rotating body from the timely changes of the rotational frequency.

According to our invention a temperature signal is fed to the electronic analyzer unit, the signal representing the temperature of the gases surrounding the rotating body in such a way that the pressure measurement is corrected for the influence of heat transferred to the gas by the elements of the measuring head. For this purpose, in a special embodiment of our invention the pressure measuring apparatus includes at least one temperature sensor for determining the gas temperature adjacent the rotating body, whose temperature signals are transmitted to the analyzer unit.

The temperature sensor will provide the electrical signal, which is supplied to the analyzer unit and is correlated with the temperature of the gas surrounding the rotating body in such a way, that the influence of the temperature of the gas, which is heated during operation of the rotating body, on the pressure measurement is corrected. The analyzer unit computes with the aid of the temperature signals from the temperature sensor the correct value for the change of the gas friction resulting from the change of the temperature dependent gas viscosity.

The calculated correction value results from the dependence of the viscosity on the gas temperature according to gas kinetic theory. According to that the viscosity is approximately proportional to the square root of the absolute gas temperature. The correlation between the electronic temperature signal and temperatures of the gas surrounding the rotating body is determined experimentally and introduced in any conventional way to the computer. The output signals are preferably correlated linearly with the gas temperature.

According to a preferred embodiment of our invention with intermittent operation of the drive coils for the rotating body, the decrease with time of the rotational frequency of the rotating body during the shut-off phase of the three-phase generator is used as the temperature signal correlated with temperature. The rotation speed decrease on the rotating body is proportional to the effective generator power required to balance the rotation speed decrease and besides is used as an intermediate datum for computation of the pressure.

The rotational speed decrease is naturally related to the temperature of the gases surrounding the rotational body, based on the following considerations: From the rotational speed decrease of the rotating body the drive coil operating power required for maintaining the rotation speed above the preset minimum rotation frequency is determined. This drive coil operating power causes the temperature rise in the measuring head. The resulting temperature does not appear instantaneously, but with a time lag determined by the heat capacity. Taking into consideration this time lag, the rotational speed decrease of the rotating body correlates with the temperature of the gas, which surrounds the rotating body, and can serve as the temperature output signal for the determination of the prevailing temperature surrounding the rotating body.

The effective drive coil operating power required of the three-phase generator for maintaining the rotation speed can be determined also from the relative duration of power application.

According to a preferred embodiment of our invention the duration of voltage application by the three-phase generator to the drive coils is used as the temperature output signal correlated with the temperature of the gas. The effective drive coil operating energy is equal to the product of the relative duration of the voltage application and the output power of the three-phase generator. This energy is proportional to the temperature which results.

With that output energy known therefore it is only necessary to measure the relative duration of the voltage application or the voltage pulse width, whereby the signal correlated with the gas temperature is again determined by consideration of the above explained time delay.

In a special embodiment, the gas-friction vacuum meter according to our invention has at least one temperature sensor positioned and arranged adjacent the rotating body in the measuring head by which the temperature of the gases surrounding the rotating body is determined.

The signals of the temperature sensors are switched into the analyzer unit, so that the temperature variations of the gas will be considered in the pressure determination.

A thermocouple or a precision resistance (resistance thermometer) can be used as a temperature sensor.

The temperature sensor is positioned at only a slight distance from the rotating body, so that the difference between the gas temperature at the rotating body and the temperature at the place where the temperature sensor is located is negligibly small.

According to another embodiment of our invention at least one electrical coil positioned and arranged in the measuring head is suitable as a temperature sensor. A resistance measuring means is used to measure the resistance of this coil, whose temperature output signal acts then upon the analyzer unit. That allows in an advantageous way a coil to be used which is already present in the measuring head as a structural component.

Also no additional components in the measuring head are required for a gas-friction vacuum meter according to yet another embodiment of the invention in which the electrical output transmitted from the three-phase generator is used as a signal representing the gas temperature. It should be considered that the temperature in the measuring head after a change in the generator power first deviates from the existing value after a time lag corresponding to the heat capacity of the measuring head. This time delay of the temperature change as a function of the power change is determined experimentally and simulated by an electronic delay circuit or by means of an analyzer unit.

BRIEF DESCRIPTION OF THE DRAWING

The above and other objects, features, and advantages of our invention will become more readily apparent from the following description, reference being made to the accompanying drawing in which the sole FIGURE is a perspective cutaway view of a measuring head of a gas-friction vacuum meter with a globe-shaped rotating body and a circuit diagram thereof.

SPECIFIC DESCRIPTION

A measuring head 1 has a ball-shaped rotating body 2, which is received in a thin-walled metal tube 3 connected to a vacuum system whose pressure is to be measured and which has not been illustrated.

A contact-free support of the rotating body 2 of magnetizable material is maintained by means of two permanent magnets 4a and 4b and two electromagnetic coils 5a and 5b as well as an electrical regulator 6, while little electrical energy is expended.

Four additional electrical coils 7a, 7b . . . , only two of which are shown, are positioned around the rotating body 2 to damp the lateral motions of the rotating body 2.

The rotating body 2 is driven electrically by means of drive coils 8a, 8b, 8c and 8d, which are connected to a three-phase generator 9 by switch $9_i$ and conductor $9_u$.

The rotating body 2 is centered between the drive coils 8a, 8b, 8c and 8d.

For determining the rotation speed of the rotating body 2 two sensing coils 10a and 10b which act as rotation speed sensors are provided. In these sensing coils 10a and 10b an electrically synchronized voltage is induced by the component of the magnetization of the rotating body 2 oscillating with the rotation frequency.

The signals from the sensing coils 10a and 10b are transmitted to the analyzer unit 11 by a signal conductor 12. The analyzer unit 11 ascertains the change of the rotation frequency of the rotating body 2 with time. From this change the pressure or also other parameters of the gas surrounding the rotating body 2 may be calculated or determined based upon prior test data stored in and retrieved by the computer.

Inside of the head 1 a temperature sensor 13 is located in the vicinity of the rotating body 2, which is attached in this specific embodiment to the metal tube 3 leading to the vacuum system.

The temperature of the metal tube 3 at the measuring point corresponds with sufficient accuracy to the temperature of the gases surrounding the rotating body 2. The temperature sensor 13 is connected by a signal conductor 14 to the input lead of a transducer 15, whose output lead is connected by a signal conductor 16 to the analyzer unit 11. In transducer 15 the signal (voltage U or resistance R) transmitted by the temperature sensor 13 (thermocouple or resistance thermometer) is converted into a voltage $U_T$ to be inputted to the analyzer unit 11 as the temperature signal.

Instead of the temperature sensor 13 also one or more electrical coils 5a and 5b, 7a to 7d, or 8a to 8d are usable as resistance thermometers. In this specific embodiment a resistance R is read from the electrical coil 7a by a signal conductor 17, which in transducer 18 is transformed into a proportional voltage $U_T$ which varies with the resistance R (also a temperature signal). This voltage $U_T$ is fed to the analyzer unit 11 by a signal conductor 19 from the transducer 18.

Further a lead of the three-phase generator 9 is read by the transducer 20, which serves as an output monitoring meter, and is connected by a signal conductor 21 to the three-phase generator 9. From transducer 20 a voltage $U_p$ is outputted which is proportional to the generator input voltage, and is fed by signal conductor 22 to an integrator 23. The integrator 23 simulates a time lag of the temperature change opposing the output change of the three-phase generator 9 and transmits further a signal $U_T$ corresponding to the temperature by the original conductor 24 to the analyzer unit 11.

By a further transducer 25 only the duration of application of power, $\tau$, of the three-phase generator 9 is recorded during intermittent operation. For connection to the three-phase generator 9 a signal conductor 26 is provided in this case. The condition for the use of the duration of application of power as a measure for the temperature of the gas surrounding the rotating body is that the generator output remains constant for all switched-on phase components. In transducer 25 the duration of power application is transformed into an electrical voltage $U\alpha$ and conducted by the signal conductor 27 to integrator 23. The integrator 23 operates on the voltage $U\alpha$ in a similar way as on the voltage $U_p$ which is produced by the converter 20, and transmits a corresponding voltage $U_T$ to the analyzer unit 11.

With the aid of the integrator 23 the adjustment of the pressure value by the temperature signals is allowed, which are ascertained and incorporated into the pressure computation by the analyzer unit 11. As the signal value the rotational speed decrease of the rotating body 2 in the operating time of the measuring head 1 is used, in which the three-phase generator 9 produces no operating output, that is, therefore the time during which the three-phase generator 9 is shut-off. The rotational speed decrease is transmitted from the analyzer unit 11 by a signal conductor 28 to the integrator 23.

In these last three cases the temperature correction of the pressure measurement is possible with negligable alteration of or interference with the measuring head 1.

We claim:

1. In a process for measuring the pressure in a gas with a gas-friction vacuum meter, in which a rotating body is suspended contact-free in a magnetic field in a measuring head between a plurality of drive coils, said rotating body being set in rotation with the aid of said drive coils and being maintained in said rotation at a rotation frequency above a given predetermined minimum rotation frequency, wherein a decrease of the rotational speed of said rotating body occurring as a result of gas friction is compensated by energization of said drive coils with changes of current flow in said drive coils made by a three-phase generator, and with at least one rotation speed sensor arranged in said measuring head, which detects and responds to said rotational frequency of said rotating body, and the sensor output signals from said rotation speed sensor are transmitted to an electronic analyzer unit, which ascertains from the timely change of said rotational frequency said pressure of said gas surrounding said rotating body, the improvement which comprises feeding to said electronic analyzer unit a temperature signal representing the temperature of said gas surrounding said rotating body in such a way that the measurement of said pressure of said gas is corrected for the influence of heat transferred to said gas by the operation of said rotating body.

2. The improvement according to claim 1 wherein said drive coils are operated intermittently and during said operation the decrease of said rotational frequency of said rotating body in the shut-off phase of said three-phase generator is used as said temperature signal correlated with said temperature.

3. The improvement according to claim 1 wherein the duration of voltage application of said three-phase generator to said drive coils is used as said temperature signal correlated with said temperature.

4. In a gas-friction vacuum meter for measuring the pressure in a gas with a gas-friction vacuum meter having a rotating body suspended contact-free in a measuring head in a magnetic field, which is set in rotation with changing currents supplied to at least one electrical drive coil, said measuring head surrounding said rotating body, and being provided with at least one rotation speed sensor for detecting and responding to said rotation frequency of said rotating body, and also provided with an analyzer unit, which is acted upon by at least one sensor output signal from said rotation speed sensor, and thus gives the pressure of said gas around said rotating body, the improvement wherein adjacent said rotating body a temperature sensor is positioned for determining the temperature of said gas, and means for applying said temperature signals to said analyzer unit.

5. In a gas-friction vacuum meter according to claim 4, the improvement wherein at least one coil is used as said temperature sensor, whose resistance is read as said temperature signal for said analyzer unit.

6. In a gas-friction vacuum meter for measuring the pressure in a gas with a gas-friction vacuum meter having a rotating body suspended contact-free in a measuring head in a magnetic field between a plurality of drive coils, said rotating body being set in rotation by current changes, continuously or intermittently, supplied to said electrical drive coils, wherein said current changes are produced by a three-phase generator, said measuring head being provided with at least one rotation speed sensor arranged in said measuring head to detect and respond to said rotational frequency of said rotating body, and with said analyzer unit, which is acted upon by a sensor output signal from said rotation speed sensors, to give said pressure of said gas around said rotational body, the improvemet wherein an output meter for said three-phase generator is provided, connected to said three-phase generator, whose generator output signal is transmitted to said analyzer unit to apply a gas-temperature compensating input thereto.

* * * * *